United States Patent
Su

(10) Patent No.: US 7,938,682 B2
(45) Date of Patent: May 10, 2011

(54) ADAPTER, A CABLE CONNECTOR WITH THE ADAPTER AND A CABLE CONNECTOR ASSEMBLY

(75) Inventor: Qi Su, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/663,672

(22) PCT Filed: Jun. 25, 2008

(86) PCT No.: PCT/US2008/068114
§ 371 (c)(1),
(2), (4) Date: Jun. 1, 2010

(87) PCT Pub. No.: WO2009/006136
PCT Pub. Date: Jan. 8, 2009

(65) Prior Publication Data
US 2010/0261383 A1    Oct. 14, 2010

(30) Foreign Application Priority Data

Jul. 2, 2007   (CN) .......................... 2007 1 0127314

(51) Int. Cl.
*H01R 13/40* (2006.01)
(52) U.S. Cl. ....................................................... 439/587
(58) Field of Classification Search ............... 439/587, 439/912, 936
See application file for complete search history.

(56) References Cited

U.S. PATENT DOCUMENTS

| | | | |
|---|---|---|---|
| 3,888,559 A | 6/1975 | Geib | |
| 4,053,702 A | 10/1977 | Erickson et al. | |
| 4,571,018 A | 2/1986 | Annoot | |
| 4,629,277 A | 12/1986 | Boettcher et al. | |
| 4,714,438 A | 12/1987 | Williams | |
| 4,891,016 A | 1/1990 | Luzzi et al. | |
| 5,230,640 A | 7/1993 | Tardif | |
| 5,888,097 A * | 3/1999 | DiCicco | 439/607.44 |
| 6,332,785 B1 | 12/2001 | Muench, Jr. et al. | |
| 6,338,637 B1 | 1/2002 | Muench, Jr. et al. | |
| 6,796,820 B2 | 9/2004 | Jazowski et al. | |
| 6,905,356 B2 | 6/2005 | Jazowski et al. | |
| 6,991,484 B2 | 1/2006 | Luzzi | |
| 7,431,599 B2 | 10/2008 | Luzzi | |
| 2004/0209516 A1 * | 10/2004 | Burris et al. | 439/587 |
| 2006/0154522 A1 * | 7/2006 | Bernhart et al. | 439/587 |
| 2009/0203258 A1 * | 8/2009 | Guenther et al. | 439/587 |
| 2010/0200265 A1 | 8/2010 | Lu et al. | |
| 2010/0279543 A1 | 11/2010 | Nguyen et al. | |

FOREIGN PATENT DOCUMENTS

| | | |
|---|---|---|
| DE | 4432542 | 3/1996 |
| EP | 0911936 | 4/1999 |
| GB | 2327140 | 1/1999 |
| JP | 2000-312430 | 11/2000 |
| TW | 379333 | 1/2000 |
| TW | 432750 | 5/2001 |
| TW | 534982 | 6/2001 |
| WO | WO 9531845 | 11/1995 |

* cited by examiner

*Primary Examiner* — Phuong K Dinh
(74) *Attorney, Agent, or Firm* — Melanie G. Gover

(57) ABSTRACT

The present invention discloses an adapter adapted to be fitted on a cable connector, comprising a body having hollow tubular shape, the body includes: a cable connecting chamber adapted to accommodate the cable inserted therein; and a cable sealing chamber adapted to form seal between the adapter and the cable by using a sealant. The body is made of elastic material, and the dielectric constant value of which is in the range from 7 to 30. The present invention also discloses a cable connector and a cable connector assembly.

19 Claims, 4 Drawing Sheets

ADAPTER, A CABLE CONNECTOR WITH THE ADAPTER AND A CABLE CONNECTOR ASSEMBLY

FIELD OF THE INVENTION

This invention relates to a cable accessory used in the power cable work, particularly, relates to an adapter and a cable connector with the adapter, more particularly, relates to a T-shaped removable power cable connector. In addition, this invention also relates to a cable connector assembly.

BACKGROUND OF THE INVENTION

With the development of the electric power industry and the increasing city underground cable system, the requirement for the power cable is increasing rapidly, specially, for the power cable of medium voltage in the range of 6-35 kV. At the same time, the requirement for the power cable accessories associated with the power cable of medium voltage is also increasing more rapidly.

The removable T-shaped cable connector (hereinafter simply referred as T-shaped connector), as one kind of the power cable accessory, is used. The T-shaped connector sheath generally comprises: a T-shaped main insulation bushing layer; an inner semi-conductive shielded layer which is disposed in the T-shaped main insulation bushing layer and integrally formed with it; and an outer semi-conductive shielded layer which is disposed on an outer surface of the T-shaped main insulation bushing layer and integrally formed with it. In order to control electric field distribution of the cable shield opening, an adapter in which an electric stress control layer is imbedded must be connected during usage of the cable connector. The adapter and the T-shaped connector sheath together constitute the electric stress control layer and the main insulation assembly. The manufacturing process of the adapter imbedded with the stress control layer is very complicated. Further, since the prior adapter imbedded with the stress control layer must be preformed, one type of adapter only can be used to the cable with a corresponding cable cross section. Thus, the prior adapter can not be easily interchanged.

In the EP patent No. 691721(B1), another T-shaped cable connector of this type is disclosed. The adapter of the EP patent has an imbedded stress control layer which is preformed. Thus, one type of adapter only can be used to the cable with a corresponding cable cross section. In the CN patent No. 2627669Y, a T-shaped cable connector and an adapter that can be drawn out by a core ribbon are disclosed. The adapter of the patent has an imbedded stress control layer. Since a "cold-shrink" mounting manner (that is, in the manner, after drawing out a core ribbon during mounting process, the rubber will automatically shrink to the original state) is adopted, the patent solved above problem that it is very difficult to mount the adapter. However, it is still needed to imbed a stress control layer into the adapter.

In the U.S. Pat. No. 6,991,484, a cold-shrink integral T-shaped cable connector is disclosed. The T-shaped cable connector of the patent is not provided with the adapter imbedded with a stress control layer. The integral T-shaped cable connector is mounted in a cold-shrink manner, which also solve above problem. However, the thickness of the crimp type terminal matching with the cold-shrink integral T-shaped cable connector is increasing as the cable cross section is increasing. Once the cable cross section exceeds a certain range, the T-shaped connector cable connecting chamber will not come into contact with the cable insulator and the cable outer shield since the thickness of the crimp type terminal increases, which will cause insufficient insulating strength for the cable. In sum, although above patents have solves the difficulty in connection with the mounting operation, they still have other defects that have not been solved.

SUMMARY OF THE INVENTION

Therefore, it is necessary to design a new T-shaped cable connector that can solve the difficulty associated with the mounting operation, has simpler manufacturing process, and can be used to the cable with a wider range of cross sections.

The present invention is directed to solve at least one aspects of the aforesaid problems existing in the prior art.

An aspect of the present invention is to provide a T-shaped cable connector with a simple mounting process.

Another aspect of the present invention is to provide a T-shaped cable connector with a simple manufacturing process.

Still another aspect of the present invention is to provide a T-shaped cable connector applicable to the cable with a wider range of cross section.

The first embodiment of this invention is to provide an adapter adapted to be fitted on the cable connector, comprising: a body having hollow tubular shape, the body includes: a cable connecting chamber adapted to accommodate the cable inserted therein; and a cable sealing chamber adapted to form a seal between the adapter and the cable by using a sealant, wherein: the body is made of elastic material, the dielectric constant value of which is in the range from 7 to 30.

In the above embodiment, since the adapter in the T-shaped cable connector made of a single layer of elastic material and can be molded at a time by the injection molding or press molding, the rate of qualified finished products has been greatly increased. Furthermore, the dielectric constant value of elastic material is between 7 and 30 and the elastic material exhibits stress control function, which may effectively improve the electric field concentration at the end of the power cable and solve the problem of the prior art with two layers structure in which an additional stress control layer must be imbedded in the adapter.

The second embodiment of this invention is to provide a cable connector, comprising: a T-shaped connector sheath, the T-shaped connector sheath includes: a T-shaped main insulation bushing made of a T-shaped main insulator; an inner semi-conductive shielded layer disposed in the T-shaped main insulation bushing and integrally formed with the T-shaped main insulator; and an outer semi-conductive shield layer disposed on an outer surface of the T-shaped main insulator and integrally formed with the T-shaped main insulator, and an adapter fitted into the T-shaped connector sheath, comprising a body having hollow tubular shape, wherein: the body is made of elastic material, and the dielectric constant value of which is in the range from 7 to 30.

The third embodiment of this invention is to provide a cable connector assembly, comprising: a T-shaped connector sheath including a T-shaped main insulation bushing composed of a T-shaped main insulator having a hollow structure; a crimp type terminal accommodated in the T-shaped main insulation bushing, one end of the crimp type terminal is adapted to be electrically connected to the cable; a thread connecting assembly for electrically connecting the other end of the crimp type terminal to the external electrical apparatus connection parts; and an adapter fitted into the cable connecting chamber and accommodating the cable, the adapter comprising a body having a hollow tubular shape. The T-shaped main insulator comprising: an electrical apparatus connecting chamber disposed at a first end of the T-shaped main insulation bushing, the electrical apparatus connecting chamber is used to accommodate the external electrical apparatus connection parts; an insulation plug chamber disposed at a second end opposite to the first end, the insulation plug chamber is adapted to accommodate the insulation plug; and a cable connecting chamber disposed at a third end of the T-shaped main insulation bushing, the cable connecting chamber is adapted to accommodate cable. The body is made of elastic material, and the dielectric constant value of which is in the range from 7 to 30.

DETAILED DESCRIPTION

Figure 1:
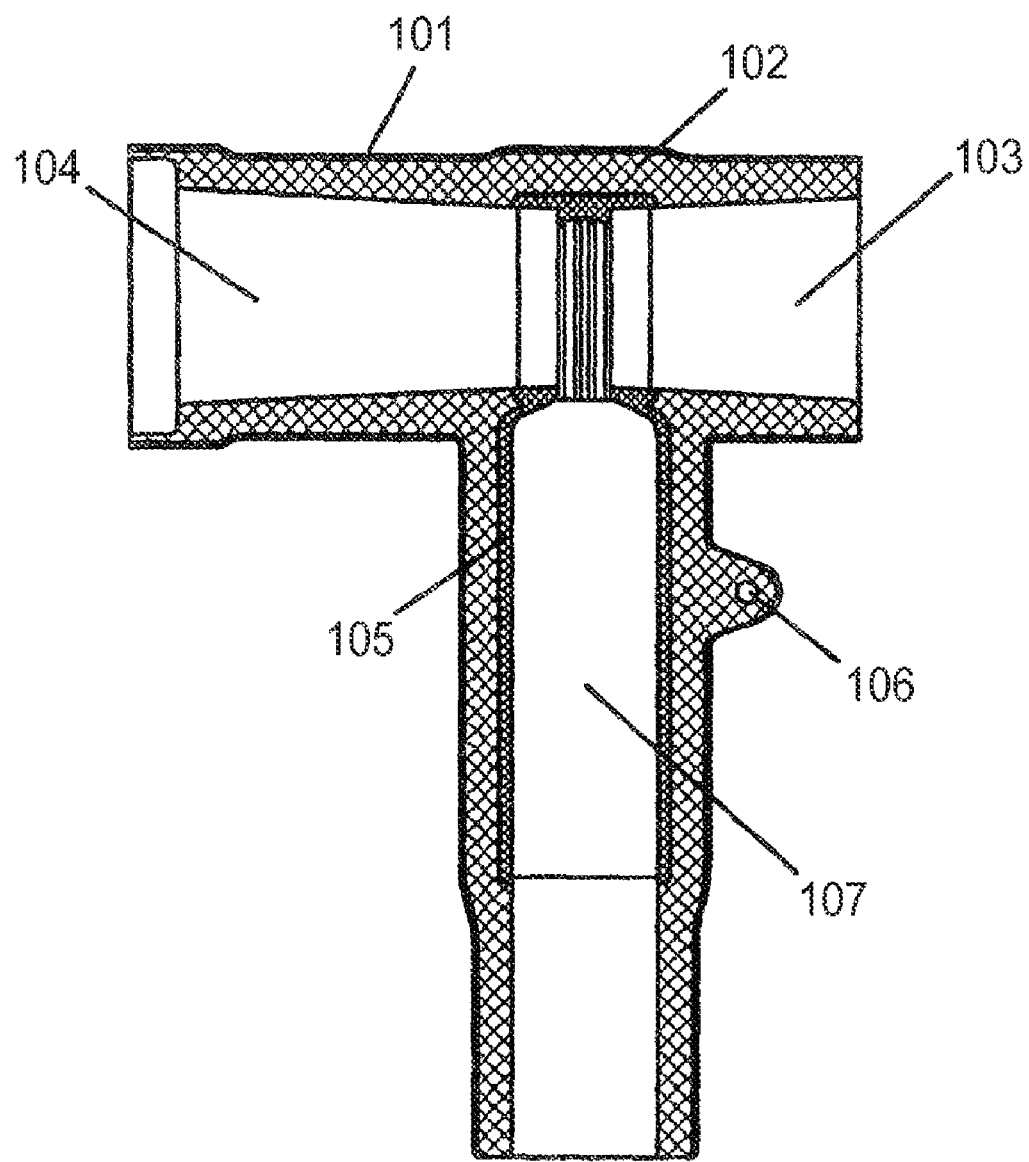
FIG. 1 is a view showing the components of a T-shaped connector sheath according to an embodiment of the present invention.

Preferred embodiments of the present invention will be described hereinafter in detail with reference to the attached drawings, wherein the like reference numerals refer to the like elements throughout the specification. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

The FIG. 1 is a view showing the components of the T-shaped connector sheath according to this invention. The number 101 indicates the outer semi-conductive shielded layer, the number 102 indicates the T-shaped main insulation bushing, the number 103 indicates the insulation plug chamber, the number 104 indicates the electrical apparatus connecting chamber, the number 105 indicates the inner semi-conductive shield layer, the number 106 indicates the grounding hole, the number 107 indicates the cable connecting chamber.

As shown in the FIG. 1, the T-shaped connector sheath 1 comprises: a T-shaped main insulation bushing 102 formed by T-shaped main insulator; an inner semi-conductive shield layer 105 which is disposed in the T-shaped main insulation bushing 102 and integrally formed with the T-shaped main insulator; and an outer semi-conductive shield layer 101 which is disposed on an outer surface of the T-shaped main insulator and integrally formed with it.

As shown in the FIG. 1, a T-shaped chamber is defined by the inner surface of the T-shaped main insulation bushing 102, the T-shaped chamber includes a horizontal chamber extending along the horizontal direction and a vertical chamber extending along the vertical direction. Specifically, the insulation plug chamber 103, the electrical apparatus connecting chamber 104 and the cable connecting chamber 107 together form the T-shaped chamber of the T-shaped connector sheath 1.

The first end (see the left end of FIG. 1) of the T-shaped main insulation bushing 102 may be connected to an external electrical apparatus (which will be described later) via the electrical apparatus connecting chamber 104. The second end (see the right end of FIG. 1), which is opposite to the first end, of the T-shaped main insulation bushing 102 may be connected to an insulation plug (which will be described later) via the insulation plug chamber 103. The third end (see the lower end of FIG. 1) can be connected to a cable (which will be described later) via the cable connecting chamber 107.

The inner semi-conductive shield layer 105 is disposed in the T-shaped chamber of the T-shaped main insulation bushing 102. As shown in the FIG. 1, the inner semi-conductive shield layer 105 extends from the vertical portion of the T-shaped chamber to the approximate middle section of the horizontal portion of the T-shaped chamber. The length that the inner semi-conductive shield 105 extends along the T-shaped chamber of the T-shaped main insulation bushing 102 is shorter than the length of the horizontal chamber and the length of the vertical chamber of the T-shaped main insulation bushing 102. In other words, the inner semi-conductive shield 105 is disposed inside the T-shaped chamber of the T-shaped main insulation bushing 102 and is not exposed to the outside. The outer semi-conductive shielded layer 101 is disposed on an outer surface of the T-shaped main insulation bushing 102 and integrally formed with it.

Figure 2:
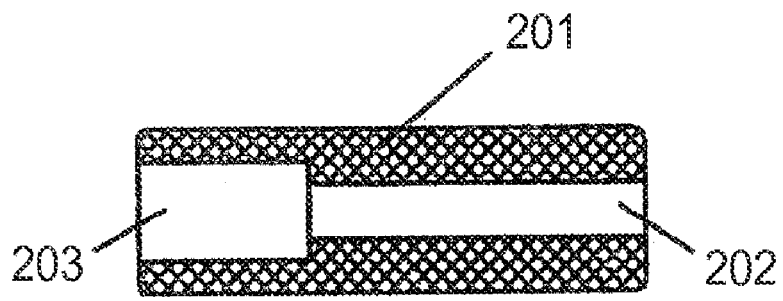
FIG. 2 is a view showing an adapter according to an embodiment of the present invention.

FIG. 2 is a view showing the adapter 2 which is not expanded. The number 201 indicates the body of the adapter, the number 202 indicates the chamber for connecting cable to the adapter, the number 203 indicates the cable sealing chamber.

As shown in FIG. 2, the adapter 2 includes a body 201 which has hollow tubular shape. A cable connecting chamber 202 that is adapted to accommodate the cable inserted therein and a cable sealing chamber 203 that is adapted to form a seal (which will be described later) between the adapter and the cable by using a sealant are formed in the body 201.

As shown in FIG. 2, the body 201 of the adapter 2 is made of a single layer of elastic material, and the dielectric constant value of which is between 7 and 30. For example, the elastic material may be silicon rubber or Ethylene-Propylene-Diene Monomer (EPDM). However, the elastic material is not limit to silicon rubber, and may be any other suitable materials as long as the requirements of insulating ability and elasticity are satisfied. In one preferable embodiment, the dielectric constant value of the single layer of elastic material is 7~15. It is shown in the experiments (which will be described later in detail), the problem of electric field concentration and insulation can be more effectively solved by use of above single layer of elastic material with dielectric constant value of 7~30 and/or 7~15. Although it is illustrated in the example that the body 201 is made of a single layer of elastic material, the present invention is limited to this. The body can has any suitable layer configurations.

In the above embodiment of this invention, since the single layer of elastic material itself has the function of stress control, which solves the conventional technical problem that an additional stress control layer must be imbedded in the adaptor. Thereby, the manufacturing process of the adapter 2 of this invention becomes simple, and the manufacturing cost of the adapter 2 is greatly reduced.

In one embodiment, the adapter 2 is formed by injection molding or press molding. Since the adapter 2 can be molded at a time by the injection molding or press molding, the rate of qualified finished products has been greatly increased. However, this invention is not limit to this, the adapter may also be formed by any other suitable manufacturing process.

Figure 3:
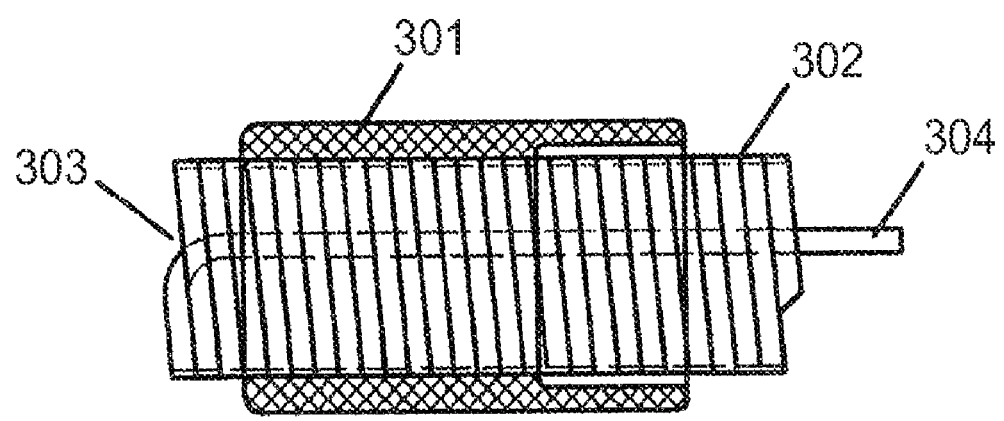
FIG. 3 is a view showing an adapter into which a core ribbon has been inserted.

The FIG. 3 is a view showing the adapter 2 into which a core ribbon 302 has been inserted. The number 301 indicates the adapter body that has been expanded by the core ribbon that has been inserted therein, the number 302 indicates the core ribbon, the number 303 indicates the cable inserting chamber, the number 304 indicates the core ribbon drawing end.

As shown in FIG. 3, the core ribbon 302 has a hollow structure, and has predetermined rigidity. The length of the core ribbon 302 is longer than the length of the expanded adapter body 301. A cable inserting chamber 303 is formed in the core ribbon 302. The inner diameter of the cable inserting chamber 303 is larger than the outer diameter of the cable so as to facilitate inserting the cable into the cable inserting chamber 30 while the adapter is in the expanded state. As shown in FIG. 3, the length of the core ribbon drawing end 304 is enough for the user to draw out the core ribbon 302 fitted in the adapter after the cable has been mounted in the expanded adapter.

The "cold-shrink" process to form the T-shaped connector by connecting the adapter 2 to T-shaped connector sheath 1 will be described as follows.

More specifically, the "cold-shrink" process includes the following steps: expanding the injection molding or mould molding adapter 2 on the core ribbon 302; inserting a cable into the cable inserting chamber 303 of the adapter 2 in an expanded state; fitting the expanded adapter 2 into the cable connecting chamber 107 of the T-shaped connector sheath so that the adapter 2 is mounted to the T-shaped connector sheath; and drawing out the core ribbon 302 fitted in the adapter by drawing the core ribbon drawing end 304. Since the adapter 2 is made of elastic material layer, the adapter itself can shrink, and can be tightly fitted on the cable by the radial press so that one mode of adapter can be adapted for several modes of cables with different cross sections.

Figure 4:
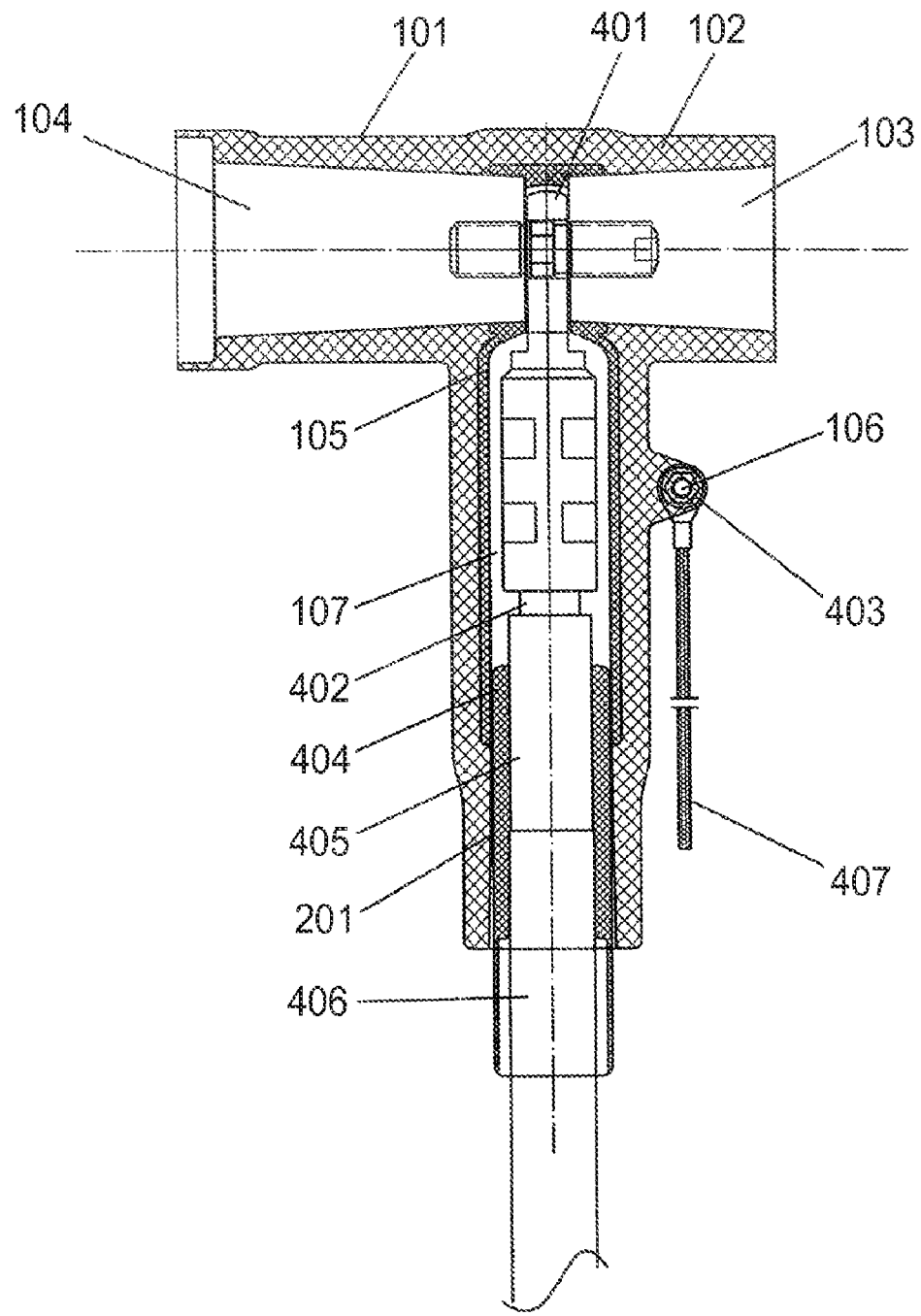
FIG. 4 is a view showing the structure for connecting the T-shaped connector to cable.

FIG. 4 is a view showing the structure for connecting the T-shaped connector to the cable. The number 401 indicates a crimp type terminal, the number 402 indicates a cable conductor, the number 403 indicates a bolt connecting assembly, the number 404 indicates a cold-shrank adapter, the number 405 indicates a cable insulator, the number 406 indicates a cable outer shield, the number 407 indicates a grounding wire, the number 408 indicates a cable copper shield, the number 409 indicates a cable.

As shown in FIG. 4, cable 409 has a cable conductor 402, a cable insulator 405, a cable outer shield 406 and a metal shielded layer 408 in the order from the most inner layer to the most outer layer. Please note that the cable structure is not limit to above, and can include other layers, such as an additional protecting layer provided on the most outer layer to protect the cable from humidity or being damaged. In one embodiment, the metal shielded layer 408 may be the copper shielded layer.

During the process of connecting the adapter that has been connected with the cable to the T-shaped connector sheath so as to form the T-shaped connector, as shown in FIG. 4, the constituent layers of the cable are peeled off in sequence so as to expose the cable conductor 402, the cable insulator 405, the cable outer shield 406 and metal shielded layer 408.

The length of the cable conductor 402 is shorter than the length of the inner semi-conductive shield 105. One end of the cable conductor 402 (the upper end in FIG. 4) is inserted into the crimp type terminal 401. A deep hole is formed inside the crimp type terminal 401. The outer diameter of the cable conductor 402 is smaller than the diameter of the hole of the crimp type terminal 401 so that the cable conductor 402 can be easily inserted into the crimp type terminal 401 during the mounting process. The length of the cable conductor 402 is longer than the length of the hole of the crimp type terminal 401 so that the cable conductor 402 can be exposed out after it is mounted into the crimp type terminal 401.

In FIG. 4, the number 404 indicates a cold-shrank adapter. As described above, the adapter 2 has a hollow structure. The adapter 2 includes a cable connecting chamber 202 and a cable sealing chamber 203. As shown in FIG. 4, after the adapter 2 is connected to the T-shaped connector sheath 1 to form the connector, the position where the cable sealing chamber of the cold-shrank adapter 404 locates corresponds to the tail end of the adapter 2. As shown in FIG. 4, the tail end of the adapter 2 is exposed from the vertical chamber portion of the T-shaped main insulation bushing 102. In the embodiment shown in FIG. 4, the position where the cable sealing chamber 203 of the cold-shrank adapter locates corresponds to the position of the metal shielded layer 408, for example, the copper shielded layer 408. At this time, a sealant is applied into the space between the cable sealing chamber 203 and the metal shielded layer 408 so as to seal the T-shaped connector.

The outer diameter of the cable insulator 405 is larger than the inner diameter of the unexpanded adapter 201 so that the cable insulator 405 can tightly fitted with the adapter when the cable is mounted into the adapter. In the cold-shrink integral T-shaped cable connector proposed in the US patent No. US20050227522(A1), since the cold-shrink integral T-shaped cable connector is not provided with the adapter, the thickness of the crimp type terminal matching with the cold-shrink integral T-shaped cable connector increases as the cross section of the cable increases. Once the cross section of the cable exceeds a certain range, since the thickness of the crimp type terminal increases, the T-shaped connector cable connecting chamber will not come into contact with the cable insulator 405 and the cable outer shield 406 which will cause insufficient insulating strength for the cable. For example, the thickness of insulator of the 8.7/15 kV cable is about 4.5 mm. However, in this invention, since the adapter that is made of the elastic material layer and has a predetermined thickness (such as 9 mm) is provided, the adapter is suitable to mate with the cable with a wider range of cross sections.

After the adapter 404 has been connected to the cable 409 by above "cold-shrink" process, the boundary between the cable outer shield 406 and the cable insulator 405 will be located approximately at the middle of the shrank adapter 404 so as to provide more sufficient transverse insulation between the cable and the outside. Then, the combination formed by the adapter 404, the cable 409 and the crimp type terminal 401 is inserted into the cable connecting chamber 107 of the T-shaped connector sheath 1 so as to form a cable connecting assembly 4 consisting of the T-shaped connector and the cable according to this invention.

Further, as shown in FIG. 4, a grounding hole 106 is provided on the outer of the T-shaped connector sheath 1. In one embodiment, the grounding hole 106 is integrally formed with the T-shaped main insulation bushing 102 of the T-shaped connector sheath 1. The bolt connecting assembly 403 connects the grounding hole 106 to the grounding wire 407 so as to connect the grounding wire 407 to the outer semi-conductive shielded layer 101 of the T-shaped main insulation bushing 102.

Figure 5:
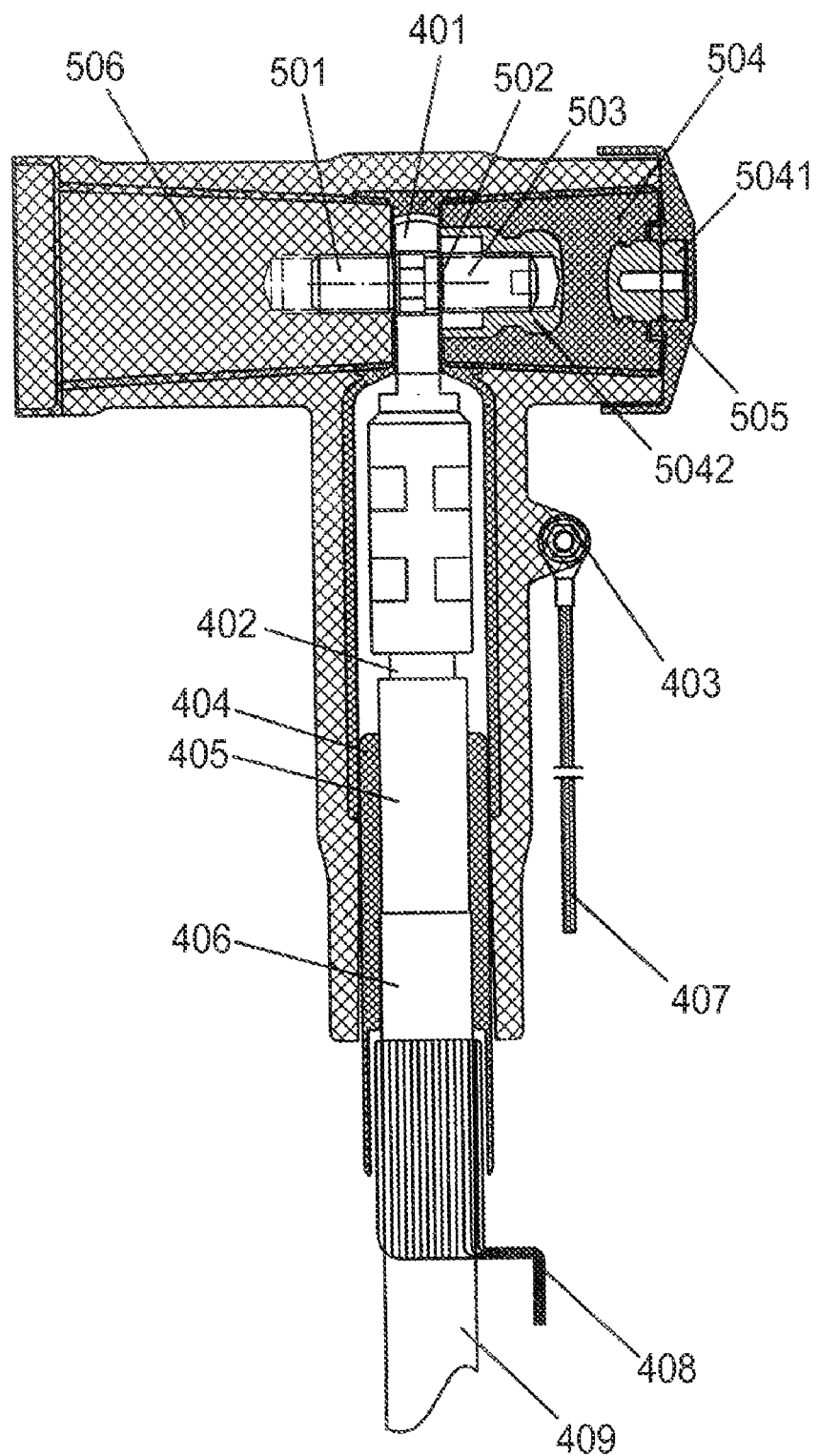
FIG. 5 is a view showing the T-shaped connector and the cable connecting assembly of FIG. 4 connected to the electrical apparatus.

FIG. 5 is a view showing the T-shaped connector and the cable connecting assembly 4 connected to the electrical apparatus. In the FIG. 5, the number 501 indicates a connecting bolt, the number 502 indicates a thread connecting chamber, the number 503 indicates a connecting nut assembly, the number 504 indicates an insulation plug, the number 505 indicates a semi-conductive shielded tail plug, the number 506 indicates an electrical apparatus connecting assembly.

The electrical apparatus connecting assembly 506 is connected to the first end (the left end of FIG. 5) of the T-shaped main insulation bushing 102 via the electrical apparatus connecting chamber 104. The insulation plug 504 is connected to the second end (the right end of FIG. 5) opposite to the first end of the T-shaped main insulation bushing 102 via the insulation plug chamber 103. In the T-shaped main insulation bushing 102, the electrical apparatus connecting assembly 506 and the insulation plug 504 cooperate so as to define a thread connecting chamber 502. The connecting bolt 501 and the connecting nut assembly 503 are disposed in the thread connecting chamber 502. The T-shaped connector of FIG. 4 and the crimp type terminal 401 of cable connecting assembly are fitted on the electrical apparatus connecting assembly 506 by the thread connecting assembly. In one embodiment, the thread connecting assembly comprises: the connecting bolt 501 passing through the other end of the crimp type terminal 401, the one end of the connecting bolt 501 is screwed to the external electrical apparatus connecting assembly 506; and a connecting nut 503 for connecting the crimp type terminal 401 to the external electrical apparatus connecting assembly 506.

An imbedded member 5041 and an imbedded member 5042 are provided in the insulation plug 504. The imbedded member 5042 is imbedded into the first end (the left end of FIG. 5) of the insulation plug 504. The imbedded member 5041 is imbedded into the second end (the right end of FIG. 5) opposite to the first end of the insulation plug. The imbedded member 5041 is used as the operational part during mounting operation of the insulation plug. The operator can mount the insulation 504 into the insulation plug chamber 103 of the T-shaped main insulation bushing 102 by screwing the imbedded member 5041.

The semi-conductive shielded tail plug 505 is mounted on the imbedded member 5041 of the insulation plug 504 so that the imbedded member 5041 of the insulation plug 504 is connected to the outer semi-conductive shielded layer 101 of the T-shaped connector sheath 1.

In addition, connecting the adapter 404 to cable 409 by use of the "cold-shrink" process, and then inserting the combination formed by the adapter 404, the cable 409 and the crimp type terminal 401 into the cable connecting chamber 107 of the T-shaped connector sheath 1. In this way, T-shaped connector and the cable connecting assembly 4 are mounted to the electrical apparatus connecting assembly 506.

Now, the examples of the T-shaped connector incorporating the adapter according to the present invention will be described in detail.

Example 1

Using silicon rubber with dielectric constant value 30 to manufacture the above-mentioned adapter with a single layer structure, wherein the thickness of the adapter is 9 mm, and using the silicon rubber, the insulating strength of which is more than 22 kV/mm, to manufacture the T-shaped connector. Then, testing the performances of the adapter by mounting the adapter to a cable with a cross section area 185 $mm^2$, made of cross-linked polyethylene with the voltage class 26/35 kV. The test result is as follows.

TABLE 1

Test on the power frequency withstand voltage and the partial discharge (background <2pC)

|  | AC withstand voltage (50 Hz) 117 kV | 45 kV |
|---|---|---|
| Sample 1 | 30 minutes, no breakdown | <2pC |
| Sample 2 | 30 minutes, no breakdown | <2pC |
| Sample 3 | 30 minutes, no breakdown | <2pC |

Example 2

Using silicon rubber with dielectric constant value 15 to manufacture the above-mentioned adapter with a single layer structure, wherein the thickness of the adapter is 9 mm, and using the silicon rubber, the insulating strength of which is more than 22 kV/mm, to manufacture the T-shaped connector. Then, testing the performances of the adapter by mounting the adapter to a cable with a cross section area 185 $mm^2$, made of cross-linked polyethylene with the voltage class 12/20 kV. The test result is as follows.

TABLE 2

Test on the power frequency withstand voltage and the partial discharge (background <1pC)

|  | AC withstand voltage (50 Hz) 54 kV | 21 kV |
|---|---|---|
| Sample 4 | 30 minutes, no breakdown | <1pC |
| Sample 5 | 30 minutes, no breakdown | <1pC |
| Sample 6 | 30 minutes, no breakdown | <1pC |

Example 3

Using silicon rubber with dielectric constant value 7 to manufacture the above-mentioned adapter with a single layer structure, wherein the thickness of the adapter is 9 mm, and using the silicon rubber, the insulating strength of which is more than 22 kV/mm, to manufacture the T-shaped connector. Then, testing the performances of the adapter by mounting the adapter to a cable with a cross section area 185 $mm^2$, made of cross-linked polyethylene with the voltage class 8.7/15 kV. The test result is as follows.

TABLE 3

Test on the power frequency withstand voltage and the partial discharge (background <1pC)

|  | AC withstand voltage (50 Hz) 39 kV | 15 kV |
|---|---|---|
| Sample 7 | 30 minutes, no breakdown | 0.75pC |
| Sample 8 | 30 minutes, no breakdown | 0.69pC |
| Sample 9 | 30 minutes, no breakdown | 0.81pC |

Based on above examples, by using the elastic material with stress control function, the present invention solves the technical problem of the prior arts with the two-layer-structure in which an additional stress control layer must be imbedded in the adapter. Further, the present invention not only can solve the problem about electric field concentration at the end of the power cable, but also can ensure the adapter with good insulation property. Accordingly, the manufacturing process of the adapter 2 of this invention becomes simple, and the manufacturing cost of the adapter 2 is greatly reduced. In addition, the present invention also provides a cable connector with above adapter, and a cable connector assembly incorporating the above adaptor Although several preferred embodiments has been shown and described, it would be appreciated by those skilled in the art that changes may be made in these embodiments without departing from the principles and spirit of the invention, the scope of which is defined in the claims and their equivalents.

What is claimed is:

1. An adapter adapted to be fitted on the cable connector, comprising:
    a body having a hollow tubular shape, the body includes:
        a cable connecting chamber adapted to accommodate the cable inserted therein; and
        a cable sealing chamber adapted to form a seal between the adapter and the cable by using a sealant, wherein:
        the body is made of elastic material, the dielectric constant value of which is in the range from 7 to 30.

2. The adapter according to claim 1, wherein the dielectric constant value of the body is in the range from 7 to 15.

3. The adapter according to claim 1, wherein the body is formed by injection molding or mould molding.

4. The adapter according to claim 1, wherein the body is made of silicon rubber or EPDM.

5. The adapter according to claim 1, wherein the body is made of a single layer of elastic material.

6. A cable connector, comprising:
    a T-shaped connector sheath, the T-shaped connector sheath includes:
        a T-shaped main insulation bushing made of a T-shaped main insulator;
        an inner semi-conductive shielded layer disposed in the T-shaped main insulation bushing and integrally formed with the T-shaped main insulator; and
        an outer semi-conductive shield layer disposed on an outer surface of the T-shaped main insulator and integrally formed with the T-shaped main insulator, and
    an adapter fitted into the T-shaped connector sheath, comprising a body having hollow tubular shape, wherein:
        the body is made of elastic material, and the dielectric constant value of which is in the range from 7 to 30.

7. The cable connector according to claim 6, wherein the dielectric constant value of the body is in the range from 7 to 15.

8. The cable connector according to claim 6, wherein the adapter body comprising:
    a cable connecting chamber adapted to accommodate the cable inserted therein; and
    a cable sealing chamber adapted to form a seal between the adapter and the cable by using a sealant.

9. The cable connector according to claim 6, wherein the body is made of silicon rubber or EPDM.

10. The cable connector according to claim 6, wherein the body is made of a single layer of elastic material.

11. A cable connector assembly, comprising:
    a T-shaped connector sheath including a T-shaped main insulation bushing composed of the T-shaped main insulator having a hollow structure, the T-shaped main insulator comprising:
        an electrical apparatus connecting chamber disposed at a first end of the T-shaped main insulation bushing, the electrical apparatus connecting chamber is adapted to accommodate an external electrical apparatus connection parts;
        an insulation plug chamber disposed at a second end opposite to the first end, the insulation plug chamber is adapted to accommodate a insulation plug; and
        a cable connecting chamber disposed at a third end of the T-shaped main insulation bushing, the cable connecting chamber is adapted to accommodate a cable,
    a crimp type terminal accommodated in the T-shaped main insulation bushing, one end of the crimp type terminal is adapted to be electrically connected to the cable;
    a thread connecting assembly for electrically connecting the other end of the crimp type terminal to the external electrical apparatus connection parts; and
    an adapter fitted into the cable connecting chamber and accommodating the cable, the adapter comprising a body having hollow tubular shape, wherein:
        the body is made of elastic material, and the dielectric constant value of which is in the range from 7 to 30.

12. The cable connector assembly according to claim 11, wherein the dielectric constant value of the adapter body is in the range from 7 to 15.

13. The cable connector assembly according to claim 11, wherein further comprising:
    an external electrical apparatus connecting parts accommodated in the electrical apparatus connecting chamber; and
    an insulation plug accommodated in the insulation plug chamber.

14. The cable connector assembly according to claim 13, wherein the thread connecting assembly comprising:
    a connecting bolt passing through the other end of the crimp type terminal, one end of the connecting bolt is screwed to the external electrical apparatus connecting parts; and
    a connecting nut for tightly fitting the crimp type terminal to the external electrical apparatus connecting parts.

15. The cable connector assembly according to claim 14, wherein further comprising:
    a first imbedded member imbedded into a first end of the insulation plug and screwed to the other end of the connecting bolt; and
    a second imbedded member imbedded into a second end opposite to the first end of the insulation plug.

16. The cable connector assembly according to claim 15, wherein the T-shaped connector sheath further comprising:
    an inner semi-conductive shielded layer disposed in the T-shaped main insulation bushing and integrally formed with the T-shaped main insulator; and
    an outer semi-conductive shielded layer disposed on an outer surface of the T-shaped main insulator and integrally formed with it.

17. The cable connector assembly according to claim 16, wherein further comprising:
    a semi-conductive shielded tail plug mounted in the second imbedded member and connecting the second imbedded member to the outer semi-conductive shield layer of the T-shaped connector sheath.

18. The cable connector assembly according to claim 11, wherein the T-shaped main insulation bushing further comprises a grounding hole integrally formed in the insulation bushing, the grounding hole is connected to the grounding wire by a bolt connecting assembly.

19. The cable connector assembly according to claim 11, wherein the body is made of a single layer of elastic material.

* * * * *